(12) United States Patent
Benedetti et al.

(10) Patent No.: US 6,732,910 B2
(45) Date of Patent: May 11, 2004

(54) DEVICE AND PROCESS FOR PRODUCING A SOLDERED JOINT BETWEEN TWO JOINING PARTNERS WHICH CAN BE BY MEANS OF A COMMON CONTACT SURFACE

(75) Inventors: Bruno Benedetti, Wettigen (CH); Christoph Nagler, Zurich (CH); Joerg Stengele, Ruetihof (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/173,169

(22) Filed: Jun. 18, 2002

(65) Prior Publication Data

US 2002/0195479 A1 Dec. 26, 2002

(30) Foreign Application Priority Data

Jun. 20, 2001 (CH) .......................................... 1128/2001

(51) Int. Cl.⁷ ...................... B23K 31/02; B23K 37/04; B21K 25/00; B23P 15/04
(52) U.S. Cl. ...................... 228/200; 228/49.1; 228/256; 29/889.21; 29/889.7
(58) Field of Search ............................. 228/248.1–262, 228/49.1, 49.4, 200; 29/889.1, 889.2, 889.27, 889.6, 889.7

(56) References Cited

U.S. PATENT DOCUMENTS

| 4,125,216 | A | * | 11/1978 | Ozimec .................. 228/4.5 |
| 4,747,533 | A | * | 5/1988 | Lipschutz ................ 228/180.1 |
| 4,787,209 | A | | 11/1988 | Taylor et al. |
| 4,787,550 | A | * | 11/1988 | Masuda et al. ............ 228/49.5 |
| 5,971,058 | A | * | 10/1999 | Bolde et al. .............. 164/130 |
| 6,129,257 | A | * | 10/2000 | Xu et al. ................. 228/44.3 |
| 2002/0195479 | A1 | * | 12/2002 | Benedetti et al. |

FOREIGN PATENT DOCUMENTS

| DE | 837949 | 5/1952 |
| DE | 2454457 B1 | 6/1975 |
| FR | 977.750 | 4/1951 |
| GB | 330885 | 6/1930 |
| JP | 59-92161 | 5/1984 |

* cited by examiner

Primary Examiner—Kiley Stoner
(74) Attorney, Agent, or Firm—Adam J. Cermak

(57) ABSTRACT

A device for producing a soldered joint between two joining partners which can be joined via a common contact surface (7), using a solder material which can be introduced between the two joining partners. At least one joining partner (1), in the region of the contact surface (7), provides at least one recess, known as a solder reservoir (3), which faces the contact surface and into which the solder material can be introduced, and the solder reservoir (3) is completely delimited and surrounded by the contact surface (7).

11 Claims, 2 Drawing Sheets

DEVICE AND PROCESS FOR PRODUCING A SOLDERED JOINT BETWEEN TWO JOINING PARTNERS WHICH CAN BE BY MEANS OF A COMMON CONTACT SURFACE

TECHNICAL FIELD

The invention relates to a device and process for producing a soldered joint between two joining partners which can be joined via a common contact surface, using a solder material which can be introduced between the two joining partners.

PRIOR ART

For permanent, strong joining of two joining partners consisting of metal or metal-like materials, it is customary to employ a known soldering technique, in which the joining partners initially come into contact with one another via a common contact surface, in which a solder material is already present or is introduced subsequently. The solder material located between the two joining partners is liquefied by heating and is distributed as uniformly as possible between the two joining partners. After the layer of solder which has formed between the two joining partners has cooled, a generally intimate material-to-material bond is formed.

However, if two components or joining partners which are exposed to extremely high thermal and mechanical loads are being joined, a particularly high-quality joining technique is needed. Without restricting the inventive idea which is to be described below, reference is made to a specific joining problem which is encountered in gas turbine engineering but which can quite easily be transferred to similar joining arrangements in other technical fields.

In particular, for cooling purposes it is appropriate to integrate what are known as impingement cooling plates within the platforms of gas turbine blades or vanes, in which cooling-channel systems are provided for effective cooling of the gas turbine blades or vanes. Impingement cooling plates are used for more efficient cooling of the inner blade or vane walls which surround the cooling system, so that the ability of the gas turbine blade or vane to withstand thermal loads can be improved decisively. The very extreme operating conditions to which a gas turbine blade or vane is exposed when a gas turbine is operating mean that all the components located inside a gas turbine blade or vane, as well as the joints between these components, must have an extremely high load-bearing capacity and mechanical and thermal reliability. Soldered joints which have to be able to withstand such adverse operating conditions and are to ensure a permanent join between the impingement cooling plate and the supporting regions within a platform in a gas turbine blade or vane are produced using liquid solder materials. Liquid solder materials are more suitable than alternative solder materials, for example in the form of solder foils, solder pastes or semiliquid fillers, especially since liquid solders, compared to other types of solder materials, are distributed as homogeneously as possible between two joining partners which are to be joined to one another.

The use of liquid solder materials provides for two joining partners to be brought into intimate contact via a common contact surface and for the liquid solder then to be introduced into the narrow gap between the two joining partners. The layer thickness of liquid solder which forms between the two joining partners from sides of a peripheral edge along their contact surface is typically between 0.03 and 0.05 mm. It is in fact the formation of a layer of liquid solder which is as homogeneous as possible between the two joining partners which makes an essential contribution to the quality of the soldered joint which is formed.

Since, according to the current prior art, the liquid solder is fed in along the peripheral edge of the contact surface between the two joining partners, which directly adjoin one another, there is no guarantee that the liquid solder material will be able to spread out over the entire depth of the contact surface. Particularly in the case of large-area contact surfaces between two joining partners which are to be joined to one another, surface regions which are at a relatively great distance from the peripheral edge of the contact surface may remain unwetted by the liquid solder material. Also, there are no direct ways of checking that the area between the two joining partners which are to be joined has been wetted with the liquid solder material. However, complete wetting of the contact surface with liquid solder is imperative if a permanent soldered joint is to be formed in particular for the abovementioned components used within a gas turbine blade or vane.

SUMMARY OF THE INVENTION

The object of the invention is to develop a device and a process for producing a soldered joint between two joining partners which can be joined via a common contact surface, using a solder material which can be introduced between the two joining partners, in such a manner that, using liquid solder material which is introduced between the two joining partners, it is possible to ensure that as far as possible the entire contact surface between the two joining partners is wetted with the liquid solder material. Moreover, it is to be possible to determine the extent to which the contact surface has been wetted with liquid solder material.

The solution to the object on which the invention is based is described in claim 1. Claim 8 relates to a process according to the invention. Features which advantageously refine the inventive idea form the subject matter of the subclaims and can be found in the further description, in particular with reference to the exemplary embodiments.

According to the invention, a device for producing a soldered joint between two joining partners which can be joined via a common contact surface, using a solder material which can be introduced between the two joining partners, is developed in such a manner that at least one joining partner, in the region of the contact surface, provides at least one recess, known as a solder reservoir, which faces the contact surface and into which the solder material can be introduced. Furthermore, the solder reservoir is completely delimited and surrounded by the contact surface.

The inventive idea provides, as an alternative to or in combination with the addition of liquid solder material through the peripheral gap between two joining partners which are fixedly joined to one another, the provision of liquid solder material in the middle of the contact surface between the two joining partners, as a result of at least one joining partner having a recess which is designed to be open toward the contact surface and in which liquid solder material has been or can be introduced. This joining partner is preferably a flat material in which the at least one recess, referred to below as a solder reservoir, passes all the way through the flat material. Consequently, it is possible for liquid solder material to be introduced into the solder reservoir when the two joining partners have already been assembled. However, solid joining partners can also be provided with recesses which are open on one side and into which recesses, which serve as solder reservoirs, liquid solder material is introduced before the two joining partners are assembled, and after the two joining partners have been assembled this liquid solder material can penetrate into the gap between the two joining partners.

The statements given below relate in general terms to the provision of solder reservoirs within joining partners which are designed as flat material, but it should be emphasized once again that the inventive idea can also be applied to the solid joining partners described above.

The recess, which is referred to as a solder reservoir, preferably has a slot-shaped contour which has edges which are as rounded as possible, in order to prevent fractures in the material. Moreover, in particular the peripheral edge of the solder reservoir which faces the contact surface is of rounded design, so that the liquid solder material which is present in the solder reservoir can penetrate into the gap between the two joining partners with as little difficulty as possible.

Depending on the size of the contact surface between the two joining partners which are to be joined, a multiplicity of solder reservoirs of this type can be provided, as far as possible arranged at equal distances from one another. The solder reservoirs are preferably arranged in such a manner as to ensure that the contact surface can be completely wetted by means of liquid solder material which can be supplied through the multiplicity of solder reservoirs provided. On the other hand, the reduction in the size of contact surface caused by the solder reservoirs should not be too great, so that the contact surface which is responsible for ensuring permanent joining retains the largest possible area.

Moreover, the provision of a multiplicity of solder reservoirs within a joining partner which is designed as flat material makes it possible to check whether the contact surface has been completely wetted with liquid solder material, by visual inspection through the solder reservoirs. In particular, the solder reservoirs can be used to establish whether solder material, starting from adjacent solder reservoirs, has propagated along the contact surface in the region of a respective solder reservoir even before the corresponding solder reservoir has been filled with liquid solder material.

BRIEF DESCRIPTION OF THE INVENTION

The invention is described below by way of example, without restricting the general idea of the invention, on the basis of exemplary embodiments and with reference to the drawings, in which.

WAYS OF CARRYING OUT THE INVENTION, INDUSTRIAL APPLICABILITY

Figure 1:
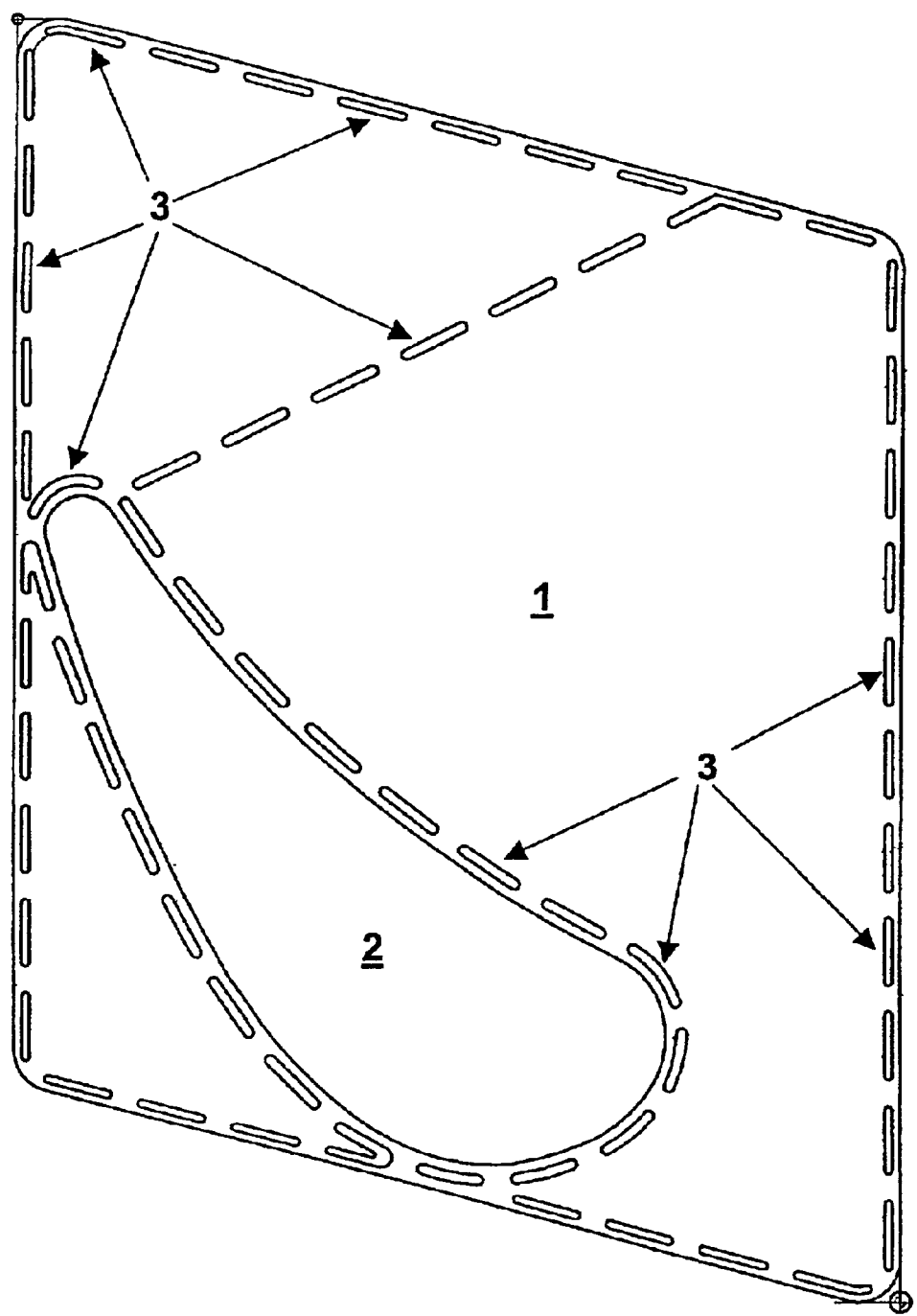
FIG. 1 shows flat material with a multiplicity of solder reservoirs.

The joining partner 1 illustrated in FIG. 1 is designed as flat material and represents a semifinished product of what is known as an impingement cooling plate which is to be integrated in a cooling system within a platform of a gas turbine blade or vane. However, the impingement cooling plate shown in FIG. 1 does not yet have any flow passage openings which are required for the impingement air cooling, but rather merely provides an outer contour which is matched to the receiving contour within a platform of a gas turbine blade or vane. Furthermore, there is a passage opening 2 which is matched to the turbine blade or vane profile and through which the cooling passages which are required for cooling of the gas turbine blade or vane run radially toward the blade or vane.

In order for the joining partner 1 which is designed as an impingement cooling plate to be secured in a platform (not shown in FIG. 1), contact surfaces which are of web-like design are provided within the platform, and the joining partner 1 will be laid onto these contact surfaces. The web-like contact surfaces run in accordance with the arrangement of the recesses 3 which have been machined into the joining partner 1 in FIG. 1 and which pass completely through the joining partner 1. The recesses 3 or solder reservoirs are designed as slot-like passage openings and accordingly are arranged centrally with respect to the contact surfaces, which are of web-like design and are not illustrated, within the platform of a gas turbine blade or vane.

The solder reservoirs 3 are machined into the joining partner 1, which consists of a superalloy, preferably by means of standard drilling or milling techniques, although with a view to economic production it is also possible to employ laser-drilling processes or EDM techniques. During production of solder reservoirs of this type, it should be noted that sharp-edged contours are to be avoided as far as possible, in order to avoid internal material distortions and corresponding concentrations of stresses.

Figure 2:
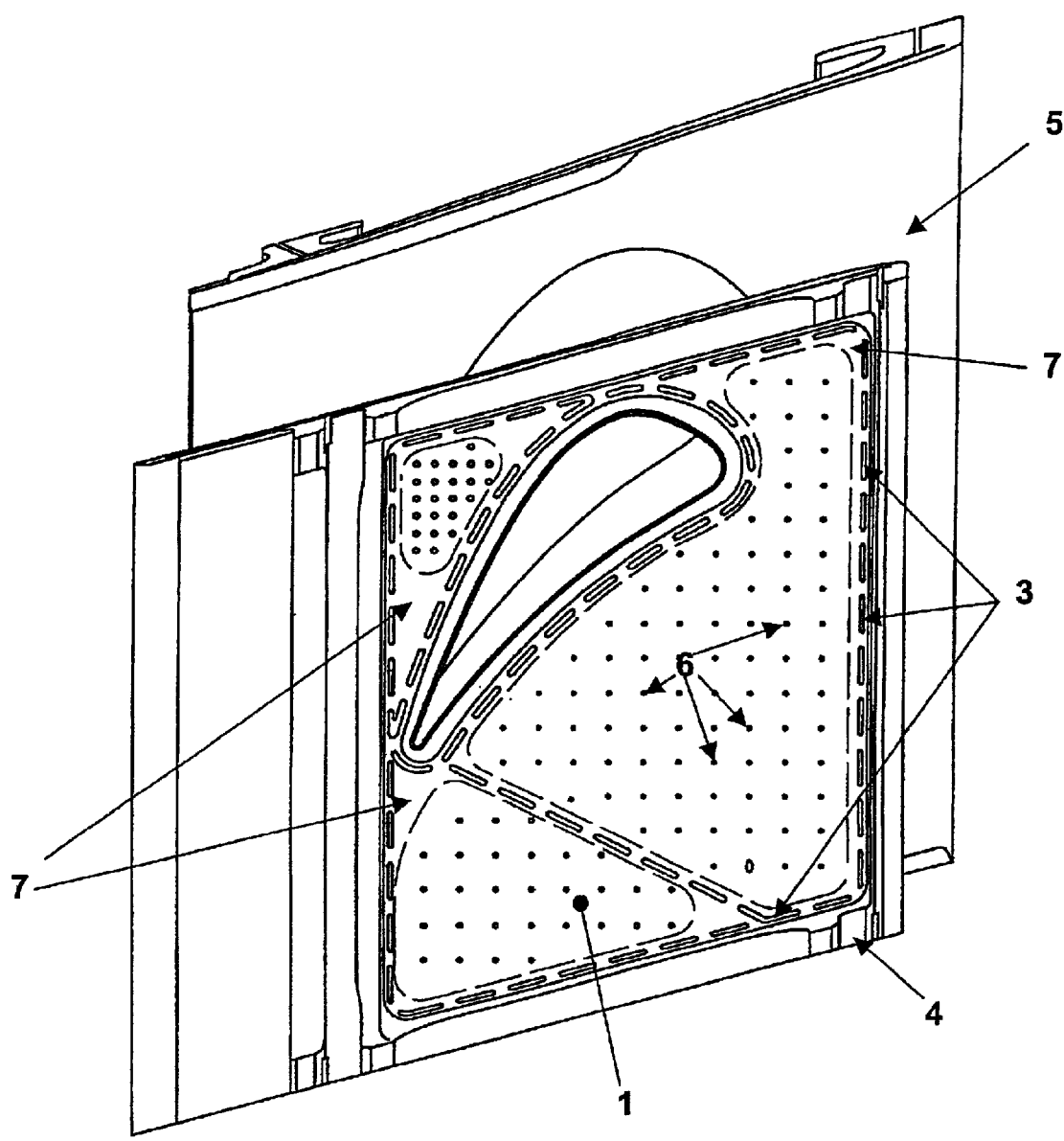
FIG. 2 shows a perspective illustration of an impingement air-cooled platform of a gas turbine blade or vane.

FIG. 2 shows a perspective view of an impingement cooling plate 1 which is already integrated in a platform 4 of a gas turbine blade or vane 5. In addition to the solder reservoirs 3 which have already been explained above, the impingement cooling plate 1 also has impingement cooling-air openings 6 through which cooling air can pass.

FIG. 2 also illustrates the contact surface 7, which is of web-like design and via which the impingement cooling plate 1 is joined to the platform 4. The contact surface 7 is delimited on one side by the peripheral edge of the impingement cooling plate 1 and on the other side by the dashed line shown in FIG. 2. Within the contact surface 7, which is for the most part of web-like design, the solder reservoirs 3 are arranged in a substantially even distribution with respect to one another and at the same distance from the respective edges of the contact surface 7.

Purely for the sake of completeness, it should be pointed out that the platform 4 which is provided with the impingement cooling plate 1 and which, incidentally, is the inner platform of a rotor blade arranged in a first row of rotor blades in a gas turbine stage, is closed off in a gas-tight manner by a cover plate (not shown), and therefore the impingement cooling plate represents an important part of an internal cooling system within a gas turbine blade or vane.

LIST OF REFERENCE SYMBOLS

1. Joining partner, impingement cooling plate
2. Passage openings
3. Recess, solder reservoir
4. Platform
5. Gas turbine blade or vane
6. Impingement cooling air openings
7. Contact surface of web-like design

What is claimed is:

1. A device for producing a soldered joint between two joining partners which can be joined via a common contact surface, using a solder material which can be introduced between the two joining partners, comprising:

at least one joining partner, in the region of the contact surface, having at least one recess including a solder reservoir, which faces the contact surface and into which the solder material can be introduced, and wherein the solder reservoir is completely delimited and surrounded by the contact surface;

wherein the solder reservoir has rounded boundary edges oriented toward the recess.

2. The device as claimed in claim 1, wherein at least one joining partner, in which the at least one solder reservoir is provided, is formed as a flat material, and in that the solder reservoir comprises an opening which passes all the way through the flat material.

3. The device as claimed in claim 1, wherein the solder reservoir comprises a slot-shaped recess which runs along a straight or curved line.

4. The device as claimed in claim 1, wherein the solder material comprises a liquid solder or a solder material which can be liquefied.

5. The device as claimed in claim 1, wherein the at least one solder reservoir is arranged centrally with respect to the contact surface.

6. The device as claimed in claim 1, further comprising:

a multiplicity of solder reservoirs in the at least one joining partner, the multiplicity of solder reservoirs being uniformly distributed in relation to the contact surface.

7. A process for producing a soldered joint between two joining partners which can be joined via a common contact surface, comprising:

bringing into contact the two joining partners with a common contact surface;

fixing the two joining partners against one another via the common contact surface by spot welding;

introducing liquid solder material, before or after the contact is made, into the at least one solder reservoir;

passing solder material, under the action of thermal energy, out of the solder reservoir, penetrating between the two joining partners along the contact surface, and forming a homogeneous film of solder; and cooling the film of solder to obtain a homogeneous, large-area soldered joint.

8. The process as claimed in claim 7, comprising:

when a flat material is used as the joining partner including at least one solder reservoir which passes all the way through the flat material, introducing the solder material into the solder reservoir until the solder material does not penetrate any further between the two joining partners.

9. A process comprising:

obtaining a device in accordance with claim 1, and joining together two metal surface parts using the device.

10. A process as claimed in claim 9, wherein one of said two metal surface parts consists essentially of a superalloy and the other of said two metal surface parts consists essentially of a metal surface part.

11. A process as claimed in claim 9, wherein an impingement cooling plate includes the at least one solder reservoir and is joined to a platform of a gas-turbine blade or vane.

* * * * *